US009759362B2

(12) United States Patent
Yarnell (10) Patent No.: US 9,759,362 B2
(45) Date of Patent: Sep. 12, 2017

(54) COUPLER ASSEMBLY KIT AND METHODS OF USE

(71) Applicant: Justin J. Yarnell, Eagle, CO (US)

(72) Inventor: Justin J. Yarnell, Eagle, CO (US)

( * ) Notice: Subject to any disclaimer, the term of this patent is extended or adjusted under 35 U.S.C. 154(b) by 310 days.

(21) Appl. No.: 14/530,996

(22) Filed: Nov. 3, 2014

(65) Prior Publication Data

US 2015/0123397 A1   May 7, 2015

Related U.S. Application Data

(60) Provisional application No. 61/899,742, filed on Nov. 4, 2013.

(51) Int. Cl.
*F16L 23/00* (2006.01)
*F16L 25/00* (2006.01)
*F16L 33/26* (2006.01)
*F16L 49/00* (2006.01)

(52) U.S. Cl.
CPC ........... *F16L 25/0072* (2013.01); *F16L 33/26* (2013.01); *F16L 49/00* (2013.01)

(58) Field of Classification Search
USPC ................ 285/114, 116, 415, 414, 405, 412; 138/176
See application file for complete search history.

(56) References Cited

U.S. PATENT DOCUMENTS

| | | | | |
|---|---|---|---|---|
| 672,556 A | * | 4/1901 | Hunick | F16L 27/111 138/172 |
| 928,896 A | * | 7/1909 | Bille | F16L 13/12 285/294.1 |
| 1,587,251 A | * | 6/1926 | Streicher | F16L 23/02 285/15 |
| 1,625,684 A | * | 4/1927 | Roddy | F16L 21/005 285/116 |
| 1,941,358 A | * | 12/1933 | Longfellow | E02B 11/005 138/177 |
| 1,953,006 A | * | 3/1934 | Norris | F16L 25/0018 138/176 |
| 3,044,805 A | * | 7/1962 | McDonald | F16L 51/027 285/114 |
| 4,635,970 A | * | 1/1987 | Haines | F16L 21/08 285/114 |
| 5,741,029 A | * | 4/1998 | Wilson | F16L 25/14 285/114 |
| 6,354,937 B1 | * | 3/2002 | Crook | F24F 13/0209 138/106 |

(Continued)

*Primary Examiner* — Aaron Dunwoody
(74) *Attorney, Agent, or Firm* — Leyendecker & Lemire, LLC (57) ABSTRACT

A coupler assembly kit and methods of use are described. Embodiments of the coupler assembly kit can be implemented to couple a corrugated pipe to a concrete section. Generally, the assembly kit can be implemented to couple a spigot end of the corrugated pipe to a bell end of the concrete section. In one embodiment, the coupler assembly kit can include a circumferential cable, a plurality of second cables having a threaded rod on end and an eye bolt on the other end, a plurality of linkage crosses, and a gasket. The coupler assembly kit can be assembled and implemented on location to connect a high-density polyethylene corrugated pipe to a reinforced-concrete flared end section.

19 Claims, 7 Drawing Sheets

(56) References Cited

U.S. PATENT DOCUMENTS

| | | | | |
|---|---|---|---|---|
| 6,581,984 B1* | 6/2003 | Seung-Kyu | ......... | F16L 25/0036 |
| | | | | 285/368 |
| 6,672,626 B1* | 1/2004 | Schafer | ............... | F16L 25/0063 |
| | | | | 24/200 |
| 7,644,956 B2* | 1/2010 | Crook | ..................... | F16L 35/00 |
| | | | | 285/114 |
| 7,985,037 B2* | 7/2011 | Duggan | ................... | E02F 5/10 |
| | | | | 285/411 |
| 8,864,182 B2* | 10/2014 | Buchanan | ............. | F16L 21/007 |
| | | | | 285/412 |
| 9,534,718 B2* | 1/2017 | O'Neil | .................... | F16L 35/00 |
| 2006/0087121 A1* | 4/2006 | Bradley | ................. | F16L 21/08 |
| | | | | 285/415 |

\* cited by examiner

COUPLER ASSEMBLY KIT AND METHODS OF USE

CROSS-REFERENCE TO RELATED APPLICATION

This application claims the benefit of U.S. Provisional Application No. 61/899,742, filed Nov. 4, 2013.

BACKGROUND

Storm drainage piping is a pivotal aspect of infrastructure. Storm drains take surface drainage below-ground for conveyance to a location where the drainage can be safely discharged along historic paths. Without a storm drainage system, all storm water runoff would remain above-ground flooding structures and making development difficult, if not impossible.

Currently, most common storm drainage pipes are made from either plastic, including high-density polyethylene (HDPE) and polypropylene (PP), or reinforced-concrete pipe (RCP). Plastic pipes have external corrugations and either a smooth or corrugated interior with an anticipated design life exceeding 100 years. Plastic pipe's low weight relative to reinforced-concrete pipe is the biggest advantage of plastic over reinforced-concrete pipe. The lighter weight permits lower haul costs by permitting more pipes to be loaded onto a semi-trailer. Typically, plastic pipes are easier to lay and connect since the pipes can usually be moved manually by laborers, as opposed to requiring heavy equipment to move reinforced-concrete pipes.

Structurally, the downside to plastic pipe is the flared end sections implemented with plastic pipes. The flared end sections are essentially the "mouth" of the pipe that spreads drainage and releases the drainage onto grade. The flared end sections designed for plastic pipe is typically made from HDPE or PP. Plastic flared end sections have thin-walls, are extremely lightweight, and do not have sufficient strength to withstand loads imposed by surrounding soil when the flared end section is backfilled and the pipe is buried. The top and sides of plastic flared end sections will buckle and collapse under the weight of surrounding soil. A second issue with plastic flared end sections is the lack of ability to attach any sort of guard or protective measure, for instance a trash rack, to keep animals and children from entering storm pipes. This is a substantial hazard, especially in locations where small children are present.

Reinforced-concrete pipes are concrete pipes with internal steel reinforcing. Reinforced-concrete pipes have good strength and ability to hold up under heavy loads. However, reinforced-concrete pipes are heavy, resulting in expensive transportation and installation costs. A reinforced-concrete flared end section also has good strength. Further, protective measures including trash racks can be attached to the reinforced-concreted flared end sections.

Plastic pipe and reinforced-concrete pipes generally have different cross-sections, even though their internal diameters are standardized. Reinforced-concrete pipe has a smooth wall both inside and out. Reinforced-concrete pipe can have a wall thickness ranging from 2 inches for a 12 inch internal diameter pipe to 6 inches for a 60 inch internal diameter pipe. Most plastic pipes have a corrugated exterior wall that ranges in thickness from 1.25 inches for a 12 inch internal diameter pipe to 3.2 inches for a 60 inch internal diameter pipe.

Both plastic pipes and reinforced-concrete pipes use bell-and-spigot joints. The bell is the "female" connection portion while the spigot is the "male" connection portion. The varying wall thicknesses between the two types of pipes do not permit a standard connection between the two. Both types of pipes presently utilize watertight gaskets in joints that meet the American Society of Testing and Materials (ASTM) standards. The ASTM Standard F477 is the industry accepted standard for HDPE and PP storm drainage pipe joints while ASTM Standard C443 is the industry accepted standard for reinforced-concrete storm drainage pipe joints.

Flared end sections are not wholly buried like the remainder of the storm drainage pipes. Consequently, their exposure to surface conditions and discharge of the storm water can result in some movement of the flared end section. Therefore, it is an industry standard to provide mechanical restraint to keep the flared end section securely attached to the storm drainage piping.

A coupler and gasket is needed to join a corrugated plastic pipe to a reinforced-concrete flared end section so that the full advantages of both items can be realized.

DETAILED DESCRIPTION

Embodiments of the present invention include coupler assembly kits adapted to couple a corrugated pipe to a reinforced-concrete section. It is to be appreciated that the reinforced-concrete section can include, but is not limited to, a flared end section and a pipe. Generally, the corrugated pipe can be a high-density polyethylene (HDPE) pipe or a polypropylene (PP) pipe.

In one embodiment, the coupler assembly kit can include a circumferential cable, a plurality of cables each having a threaded rod on one end and an eye bolt coupled to another end, and a plurality of linkage crosses. Generally, each of the components can be manufactured from stainless steel. In some embodiments, the coupler assembly kit can include a gasket. The gasket can generally be implemented to create a water tight connection between the corrugated pipe and the reinforced-concrete section. Although there is not an ASTM standard applicable to a joint between corrugated plastic pipes and reinforced-concrete pipes, embodiments of the present invention can include an industry-accepted gasket material to be watertight and accepted industry-wide.

In a typical implementation, holes can be drilled into the reinforced-concrete section. The cables can be secured to the reinforced-concrete section by the eye bolts. The circumferential cable can be threaded through each of the plurality of linkage crosses and placed within a valley of the corrugated pipe. Typically, ends of the circumferential cable can be coupled together using one or more wire rope clamps. The linkage crosses can generally be evenly spaced around a top half of the corrugated pipe.

Once the corrugated pipe has been inserted into the reinforced-concrete section, the plurality of cables can be coupled to the linkage crosses. Generally, the threaded ends can be threaded through the linkage cross and secured with a nut and washer. Once the cables are inserted through the linkage crosses, the cables can be tightened until a connection between the corrugated pipe and the reinforced-concrete section can be sealed.

In another embodiment, the coupler assembly kit can include a plurality of circumferential bands, a plurality of longitudinal tie bands, a plurality of threaded rods, and a gasket. Typically, the plurality of circumferential bands can each include at least two juts adapted to interface with an exterior peak of a corrugated pipe. The longitudinal tie bands can be implemented to secure the plurality of circumferential bands to the plurality of threaded rods. Generally, the threaded rods can be secured to the reinforced-concrete section. The gasket can be implemented to make the connection between the corrugated pipe and reinforced-concrete section water tight.

In one embodiment, the coupler assembly kit can be coupled to a concrete headwall. Generally, headwalls are cast with reinforcing bolts. To attach a corrugated pipe to the headwall, the longitudinal tie bands can be coupled to the reinforcing bolts cast into the headwall.

TERMINOLOGY

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The term "reinforced-concrete section," as used in this specification and the appended claims, can include, but is not limited to, a flared end section and a pipe.

The term "springline," as used in this specification and appended claims, refers to an imaginary horizontal reference line located at a mid-height, or halfway point, of a circular conduit, pipe, or tunnel.

A First Embodiment of a Coupler Assembly Kit

Figure 1:
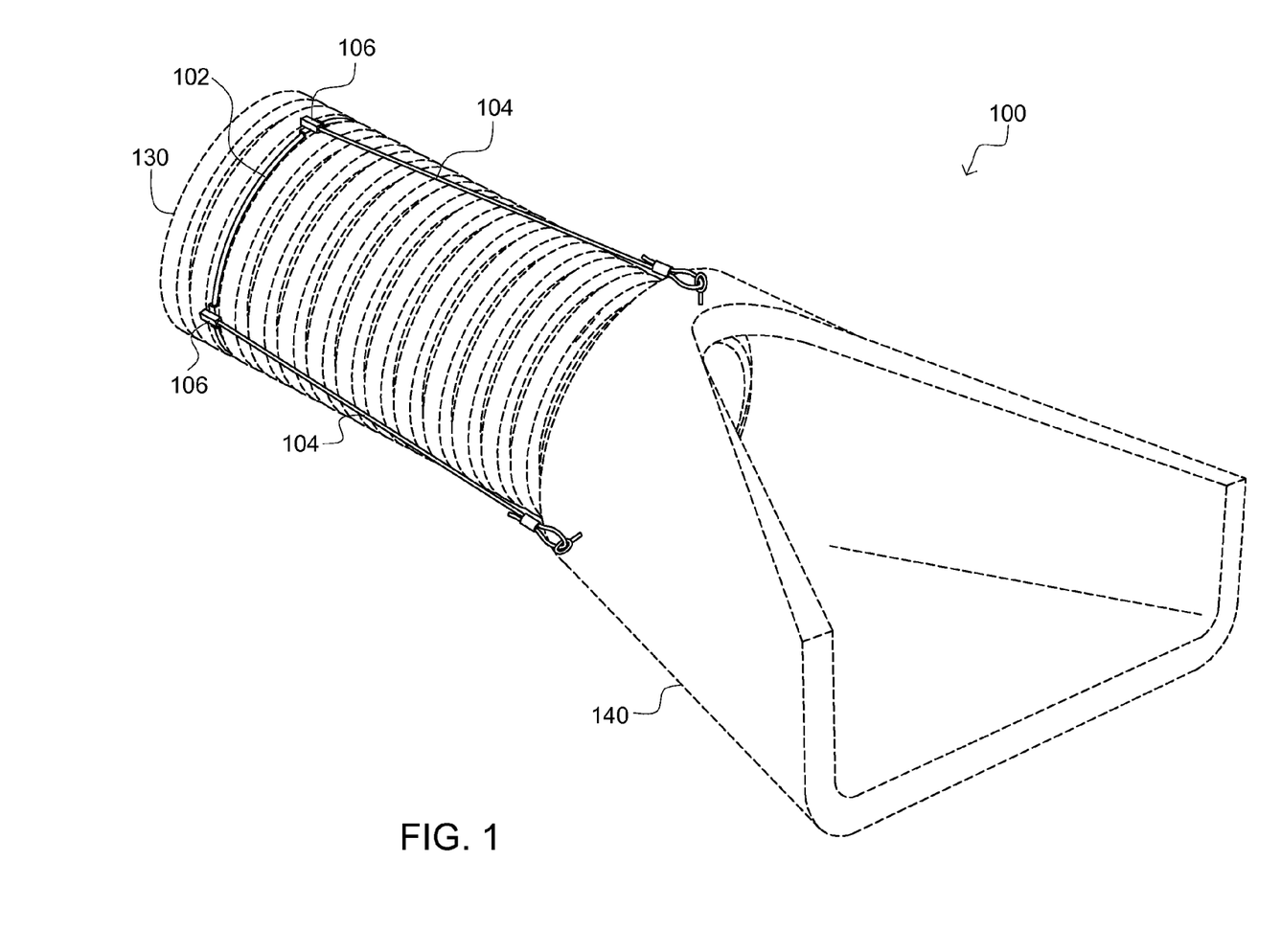
FIG. 1 is a perspective view of a coupler assembly according to one embodiment of the present invention.

Referring generally to FIGS. 1-5B, detailed diagrams of a first embodiment 100 showing a coupler assembly kit are illustrated. As shown in FIG. 1, the coupler assembly kit 100 can be implemented to couple a corrugated pipe 130 to a reinforced-concrete section 140.

Generally, the coupler assembly kit can include a first cable 102, a plurality of second cables 104, and a plurality of linkage crosses 106. A plurality of washers 110 and a plurality of nuts 112 can be implemented to couple the various components of the coupler assembly together. In some embodiments, the coupler assembly kit 100 can include a gasket 114.

The first cable 102 can generally be wrapped around an entire circumference of the corrugated pipe 130. For instance, the circumferential cable 102 can be set into an exterior valley of the corrugated pipe 130, as shown in FIG. 1. In one embodiment, the circumferential cable 102 can be set into a valley that is approximately 42 inches from an end of the corrugated pipe 130.

Figure 2:
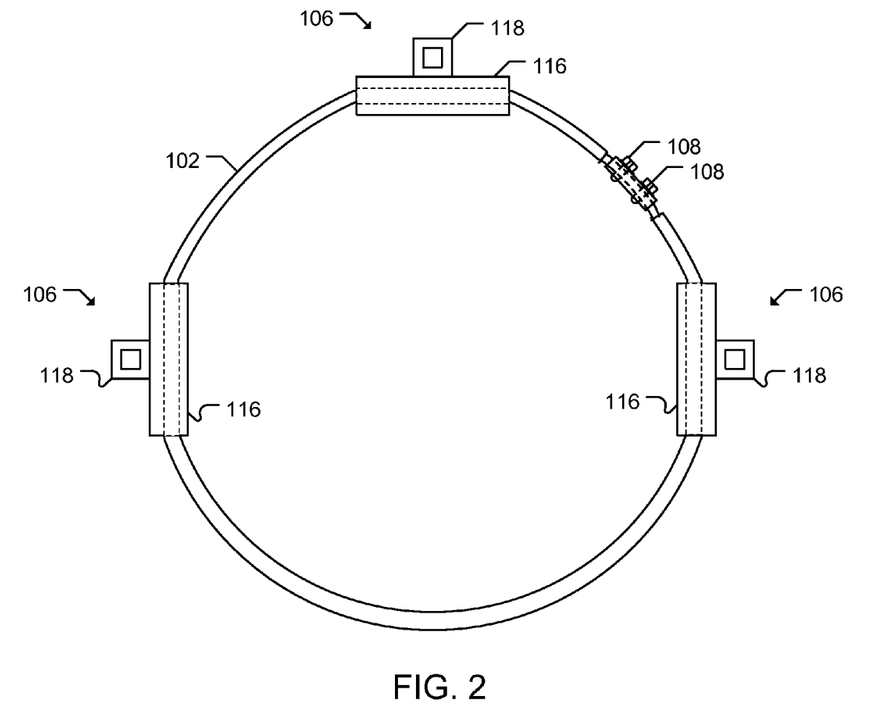
FIG. 2 is a front view of a coupler assembly according to one embodiment of the present invention.

Referring to FIG. 2, a side view of the circumferential cable 102 and the plurality of linkage crosses 106 is illustrated. As shown in FIG. 2, the circumferential cable 102 can be adapted to thread through each of the plurality of linkage crosses 106. The 3:00, 9:00, and 12:00 location of the linkage crosses 106 are generally shown. After the circumferential cable 102 has been threaded through the linkage crosses 106 and wrapped around the corrugated pipe 130, end sections of the circumferential cable 102 can coupled together and tightened.

Generally, end sections of the circumferential cable 102 can be coupled together by one or more clamps 108. For instance, wire rope clamps can be implemented to secure end sections of the circumferential cable 102 together. It is to be appreciated that other means of securing the circumferential cable 102 to itself can be implemented without exceeding a scope of the present invention. The wire rope clamps 108 can be implemented to adapt the circumferential cable 102 to a variety of different sized corrugated pipes. For instance, the circumferential cable 102 can be sized to a particular corrugated pipe on a job site. As such, the coupler assembly kit 100 can include one length for the circumferential cable 102 to fit a plurality of different corrugated pipes.

In one embodiment, the circumferential cable 102 can be a ¼ inch stainless steel aircraft cable epoxy-coated to ⁵⁄₁₆ inch outside diameter. It is to be appreciated that the circumferential cable 102 can be manufactured to various specifications depending on an implementation.

The plurality of second cables 104 can generally include a first end 120 and a second end 122 each having an attachment structure. For instance, the first end 120 can include a threaded stud and the second end 122 can be coupled to an eye bolt. In another instance, the first end 120 can include a cotter and the second end 122 can include a ball shank and clevis. In yet another instance, the second end 122 can include an eyelet formed from the cable that is adapted to couple to the reinforced-concrete section by a standard stainless steel bolt and nut. It is to be appreciated that a variety of different combinations of the aforementioned attachment structures can be implemented without exceeding a scope of the present invention. In one embodiment, each of the second cables 104 can be manufactured from ¼ inch stainless steel aircraft cable epoxy-coated to a ⁵⁄₁₆ inch outside diameter. The threaded stud end 120 can be 3 inches long and the eye bolt end 122 can include a ½ inch shaft and be between 4 to 8 inches long.

Figure 3A:
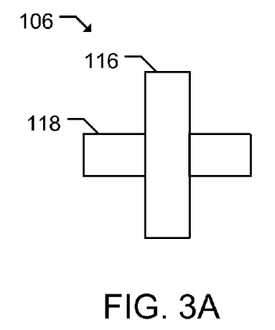
FIG. 3A is a top view of a linkage cross according to one embodiment of the present invention.
Figure 3B:
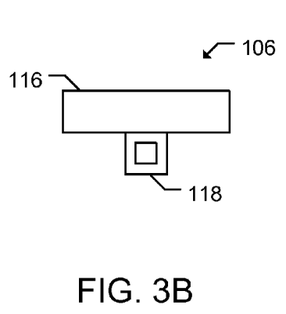
FIG. 3B is a side view of a linkage cross according to one embodiment of the present invention.
Figure 3C:
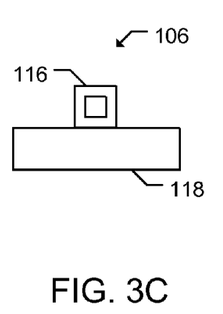
FIG. 3C is a front view of a linkage cross according to one embodiment of the present invention.

Referring to FIGS. 3A-3C, detailed diagrams of one of the linkage crosses 106 are illustrated. In one embodiment, the linkage cross 106 can include a first tube 116 and a second tube 118 directly coupled together. For instance, the first tube 116 and the second tube 118 can be welded together. The square tubes can generally be welded together approximate middle sections of each tube and at a right angle to each other, as shown in FIGS. 3A-3C. In one embodiment, the first tube 116 and the second tube 118 can each have a ½-inch inside diameter and be manufactured from stainless steel tubing. For pipes with an 18 inch inside diameter and smaller, each tube of the linkage cross 106 can be 3 inches long. For all pipes having an inside diameter greater than 18 inches, each tube of the linkage cross 106 can be 4 inches long.

In a typical implementation, assuming a cross-section of the circumferential cable 102 is viewed as an analog clock, the linkage crosses 106 can be placed at approximately 12:00, 3:00, and 9:00 around the corrugated pipe 130. The reinforced-concrete section 140 can be core-drilled similarly at the 12:00, 3:00, and 9:00 positions. Once the reinforced-concrete section 140 has been core-drilled, the eye bolt end 122 can be inserted through the wall of the concrete-reinforced section 140 and a nut can be implemented to secure the eye bolt end 122 inside of the wall. The second cable 104 can then be securely coupled to the reinforced-concrete section 140.

Referring to FIG. 1, a first linkage cross can be located at a top or apex of a valley of the corrugated pipe 130, a second linkage cross can be located approximately at a proximal springline of the corrugated pipe 130, and a third linkage cross (not shown) can be located approximately at a distal springline of the corrugated pipe 130. Once the linkage crosses 106 have been placed in position, ends the circumferential cable 102 can be coupled together. By securing the circumferential cable 102 tightly together, the first tubes 116 of the linkage crosses 106 can be securely located in a valley of the corrugated pipe 130.

The linkage crosses 106 can be implemented to couple the circumferential cable 102 to the plurality of second cables 104. Once the eye bolt ends 122 are securely attached to the concrete-reinforced section 140, the second cables 104 can be laid along the corrugated pipe 130. Each of the threaded stud ends 120 of the second cables 104 can then be inserted into one of the linkage crosses 106 spread around the corrugated pipe 130. Typically, one each of the washers 110 and the hex nuts 112 can be placed on each of the threaded stud ends 120 after the threaded stud has been threaded through a linkage cross. Tightening of the hex nuts 112 can pull the corrugated pipe 130 and the reinforced-concrete section 140 together. For instance, the first tubes 116 can interface with a peak of the corrugated pipe 130 as the threaded rods 120 are tightened to the second tubes 118, pulling the corrugated pipe 130 tight with the concrete section 140.

In one embodiment, a flexible sealant can be placed on an inside of the concrete-reinforced section 140 to act as the gasket 114. The gasket 114 can be implemented to make the interface between the corrugated pipe 130 and concrete-reinforced section 140 watertight. For instance, an industry-accepted butyl rubber base flexible sealant can be implemented as the gasket 114. Generally, the gasket 114 can be equipped with an adhesive on one side and placed within a bell of the concrete-reinforced section 140.

Figure 4A:
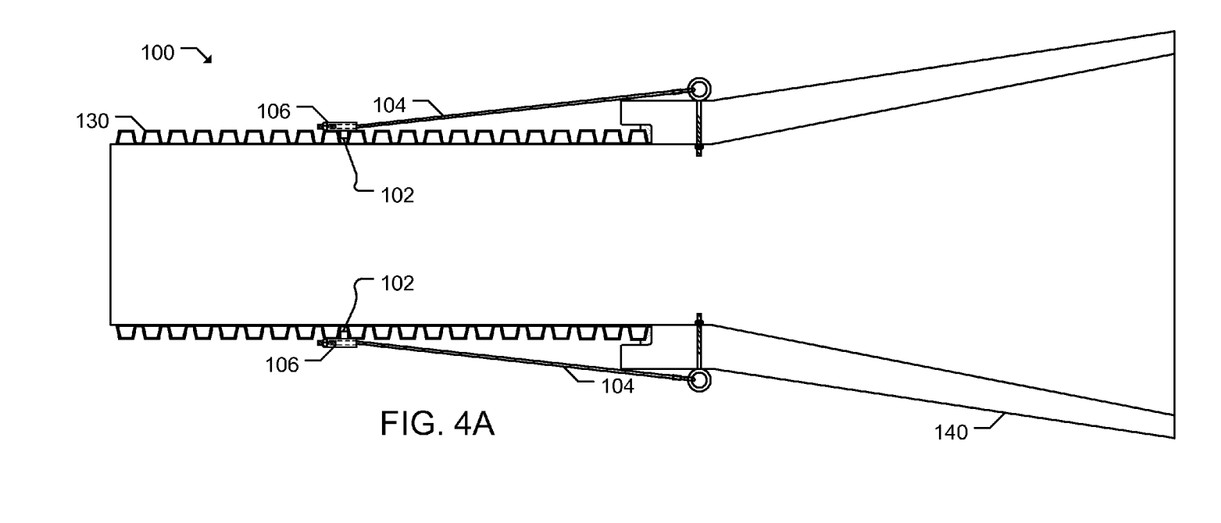
FIG. 4A is a top sectional view of a coupler assembly according to one embodiment of the present invention.
Figure 4B:
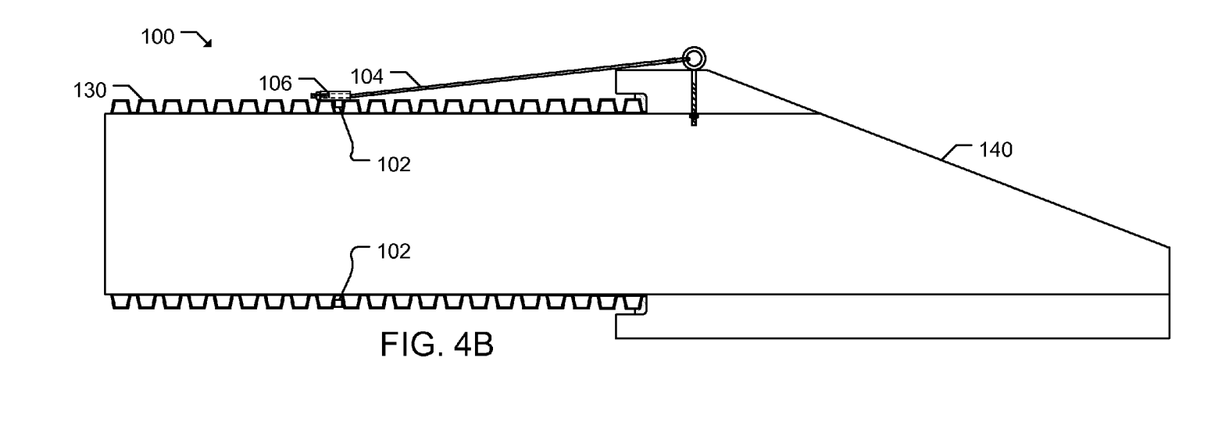
FIG. 4B is a side sectional view of a coupler assembly according to one embodiment of the present invention.

Referring to FIGS. 4A-4B, a top section view and a side section view of the first embodiment coupler assembly kit 100 are illustrated. FIG. 4A generally shows the circumferential cable 102, two of the second cables 104, two of the linkage crosses 106, and the corrugated pipe 130 being coupled to a concrete section 140. FIG. 4A further shows the 3:00 and 9:00 locations of where the two second cables 104 are coupled to the linkage crosses 106. FIG. 4B generally shows the 12:00 location of the second cable 104 coupled to the linkage cross 106.

Figure 5A:
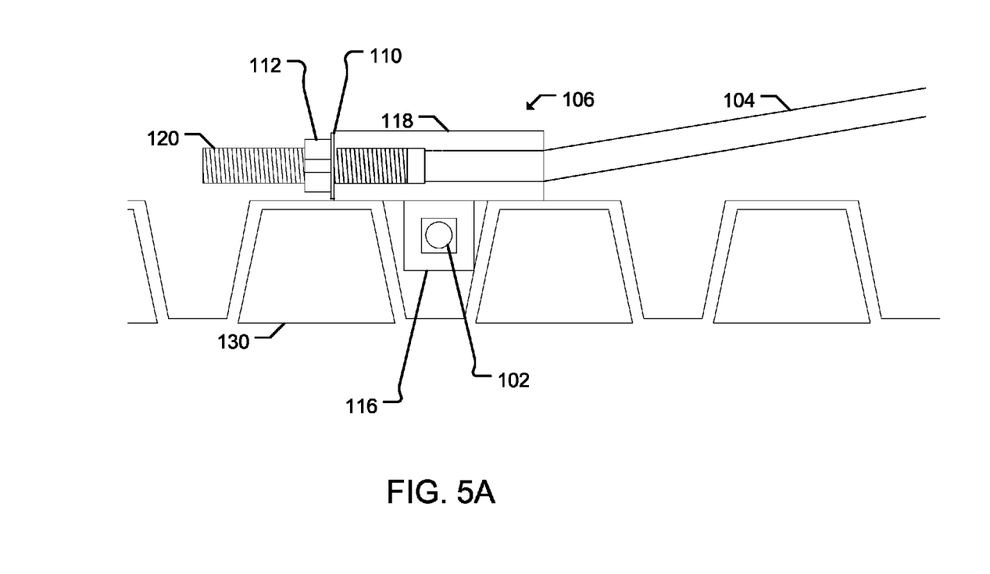
FIG. 5A is a close up side sectional view of a coupler assembly according to one embodiment of the present invention.

Referring to FIG. 5A, a close up cross-sectional side view of the first end 120 of the second cable 104 interfacing with one of the linkage crosses 106 is illustrated. As shown, the threaded stud end 120 can insert into and couple to the second tube 118 of the linkage cross 106. The first tube 116 of the linkage cross 106 can be located in a valley of the corrugated pipe 130. The circumferential cable 102 is shown threaded through the first tube 116.

Figure 5B:
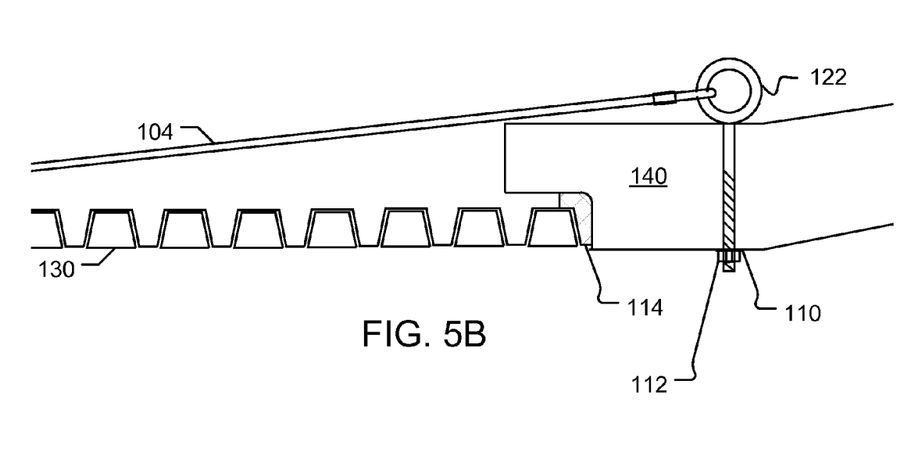
FIG. 5B is a close up side sectional view of a coupler assembly according to one embodiment of the present invention.
Figure 8:
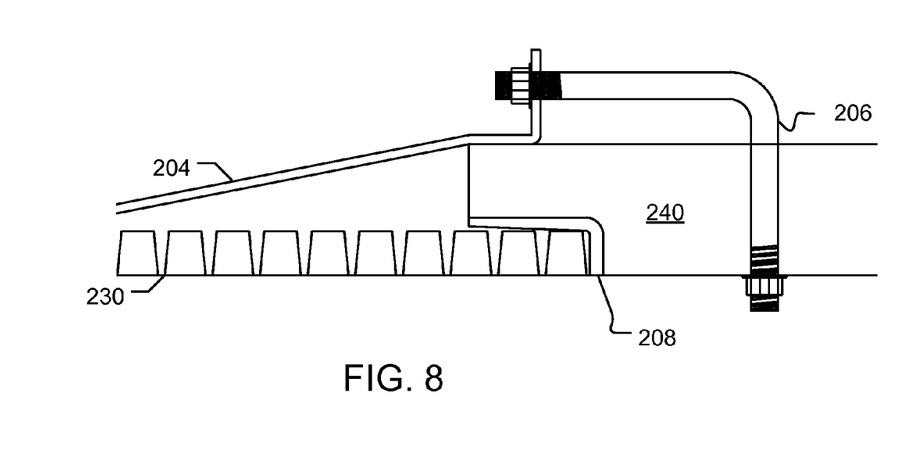
FIG. 8 is a close up side sectional view of another coupler assembly according to one embodiment of the present invention.
Figure 9:
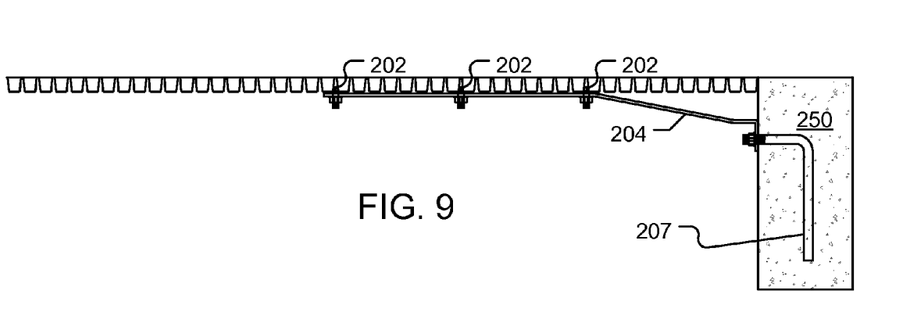

Referring to FIG. 5B, a close up cross-sectional side view of the second end 122 of the second cable 104 coupling to the corrugated section 140 is illustrated. As shown, the second cable 104 can couple to the corrugated section 140 by the eye bolt end 122. A nut can be implemented to secure the eye bolt end 122 to the corrugated section 140. FIG. 8 further shows a portion of the gasket 114.

An Example Implementation of a First Embodiment Coupler Assembly Kit

Generally, the first embodiment coupler assembly kit 100 can be implemented to couple a corrugated pipe to a reinforced-concrete component. Typically, the coupler assembly kit 100 can be assembled on site. For illustrative purposes only, a reinforced-concrete flare end section will be referenced for this example.

In a first step, a user can drill three ⅝-inch diameter holes in the reinforced-concrete flared end section. Typically, a first hole can be located on top while two other holes can be located at springline on either side of the flared end section. The holes can be located approximately 6 inches from an end of a bell of the flared end section.

In a second step, the eye bolt ends 120 of the plurality of second cables 104 can be inserted into the holes drilled in the first step. The washers 110 and the hex nuts 112 can be included for each eye bolt 120 on an interior of the flared end section. Generally, the second cables 104 can be coiled and draped on the flared end section while the flared end section is placed in the trench bottom.

After the eye bolts 120 are coupled to the flared end section and the flared end section has been placed in position, the gasket 114 can be coupled to the flared end section in a third step. To couple the gasket 114, an inside of the bell can be first cleaned with a stiff-bristled brush. After ensuring that a surface of the interior is dry, and all dirt and debris is removed, the gasket 114 can be coupled to the interior. In one instance, an adhesive backing can be removed from the gasket. The gasket can then be placed around an inside of the bell with the adhesive side interfacing with the bell. Typically, the gasket 114 should be placed as far into the bell as possible while still being adhered to the bell.

In a fourth step, the circumferential cable 102 can be threaded through 3 linkage crosses 106. Once the circumferential cable 102 has been threaded through the 3 linkage crosses 106, the circumferential cable 102 and the linkage crosses 106 can be placed into a valley of the corrugated pipe 130. Generally, the circumferential cable 102 and the linkage crosses 106 can be placed in a valley that is approximately 42 inches from an end of the corrugated pipe 130 that will interface with the flared end section. The circumferential cable 102 can be wrapped around the corrugated pipe 130 and should be seated within one continuous valley of the corrugated pipe 130. Ends of the circumferential cable 102 can then be secured together using the one or more clamps 108. Generally, the one or more clamps 108 should be placed at least 3 inches apart and located between the top and the springline of the corrugated pipe 130.

In a fifth step, after installing but prior to tightening the clamps 108, the linkage crosses 106 can be grouped together. The circumferential cable 102 can then be pulled taut around the corrugated pipe 130. After pulling the circumferential cable 102 taut, the linkage crosses 106 can be moved along the circumferential cable 102 to a top and left and right springlines of the corrugated pipe 130 and then the clamps 102 can be tightened. Generally, the linkage crosses 106 can be located to approximately align with the holes drilled into the flared end section. It is to be appreciated that a spigot end of the corrugated pipe 130 should be oriented toward the flared end section.

In a sixth step, a user can manually push the corrugated pipe 130 into the flared end section as far as possible.

After the corrugated pipe 130 has been inserted into the flared end section, the studs 122 of the second cables 104 can then be inserted into the linkage crosses 106 in a seventh step. As shown generally in the figures, the top of the flared end section can be connected to the linkage cross 106 on a top of the corrugated pipe 130, the proximal springline of the flared end section can connected to the linkage cross 106 at the proximal springline of the corrugated pipe 130, and the distal springline of the flared end section can be connected to the linkage cross 106 at the distal springline of the corrugated pipe 130. Generally, one flat washer 110 and one hex nut 112 can each be threaded on the stud 122 on a backside of each linkage cross 106. The hex nuts 112 can then be tightened on each stud 122. In one embodiment, the hex nuts 112 can be tightened to a torque of approximately 20 ft-lbs. It is to be appreciated that no damage should occur to the corrugated pipe 130 but each of the second cables 104 should be taut.

In an eighth step, the corrugated pipe 130 and the flared end section can be backfilled.

It is to be appreciated that the aforementioned example implementation is for illustrative purposes only. The steps can be altered without exceeding a scope of the present invention.

A Second Embodiment of a Coupler Assembly Kit

Referring generally to FIGS. 6A-9, detailed diagrams of an embodiment 200 showing a coupler assembly kit is illustrated. The second embodiment coupler assembly kit 200 can be implemented to couple a corrugated pipe 230 to a reinforced-concrete section 240. For instance, the concrete section can include, but is not limited to, a reinforced-concrete pipe and a reinforced-concrete flared end section. Typically, a spigot end of the corrugated pipe can be coupled to a bell end of the concrete section.

The second embodiment coupler assembly kit 200 can generally include a plurality of circumferential bands 202, a plurality of longitudinal tie bands 204, a plurality of rods 206, and a gasket 208. In some embodiments, reinforcing bolts 207 can be implemented in place of the rods 206.

In one embodiment, the second embodiment coupler assembly kit 200 can include at least three circumferential bands 202. Typically, the circumferential bands 202 can be spaced approximately 12 inches apart. Depending on a size of a corrugated pipe, the circumferential bands 202 can be sized to match an exterior circumference of a particular corrugated pipe.

The plurality of circumferential bands 202 can be adapted to secure around the corrugated pipe 230. In one embodiment, the plurality of circumferential bands 202 can each include one or more juts 210 adapted to interface with a peak of a corrugated pipe. For instance, a planar section of stainless steel can be welded to an interior of the circumferential band 206. The jut 210 can be adapted to laterally secure the circumferential band 202 to a corrugated pipe.

In one embodiment, each of the plurality of circumferential bands 202 can include a first semi-circle section 220 and a second semi-circle section 222. In one embodiment, the semi-circle sections can be made of stainless steel. The two semi-circle sections can each include flanges 212 at ends of the sections to secure to one another. Typically, a bolt and nut assembly 214 can be implemented to secure the semi-circle sections together.

For illustrative purposes only, if a cross-section of a circumferential band is viewed as an analog clock with 12:00 being the top, the flanges 212 can be located approximately between 1:00 and 2:00 and between 7:00 and 8:00. Generally, each circumferential band 202 can include at least four juts 210. The just 210 can be sized to fit within a valley of the corrugated pipe 230.

Figure 6A:
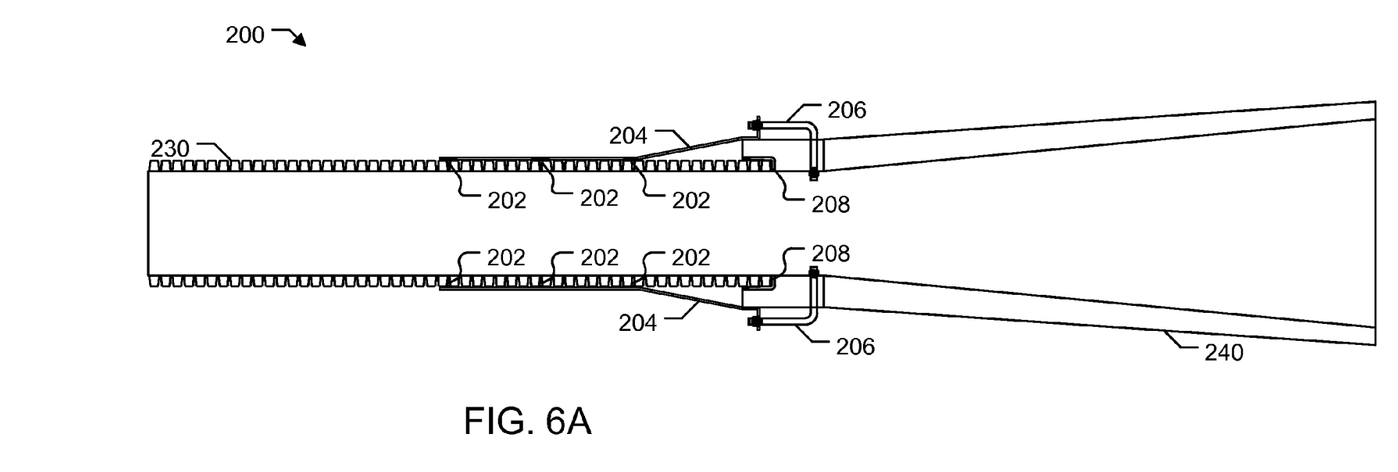
FIG. 6A is a top sectional view of another coupler assembly according to one embodiment of the present invention.
Figure 6B:
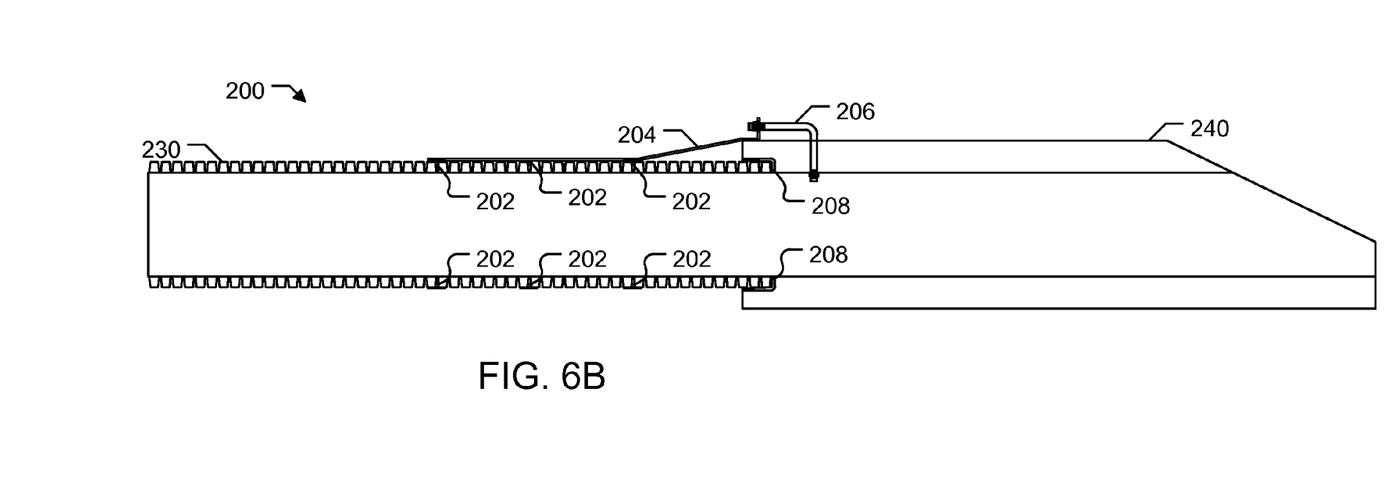
FIG. 6B is a side sectional view of another coupler assembly according to one embodiment of the present invention.
Figure 7:
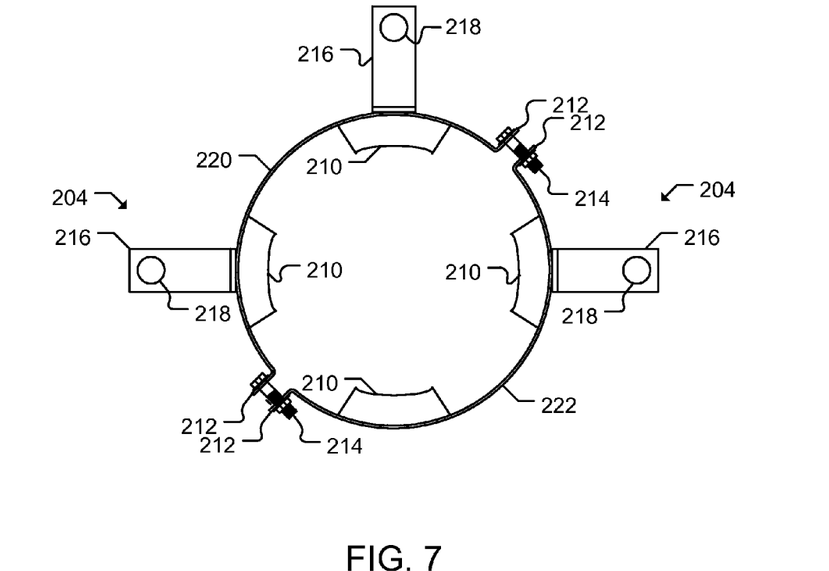
FIG. 7 is a front view of another coupler assembly according to one embodiment of the present invention.
Figures 7, 9:
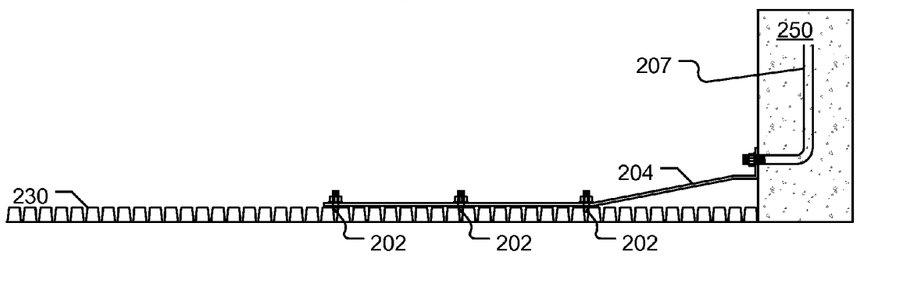
FIG. 9 is a top sectional view of another coupler assembly coupled to a concrete headwall according to one embodiment of the present invention.

In one embodiment, the plurality of tie bands 204 can be comprised of strips of stainless steel adapted to couple to the plurality of circumferential bands 202 and to the plurality of rods 206. Generally, a portion of one end of the tie band 204 can be directly coupled to each of the circumferential bands 202. The other end of the tie bands 204 can include a flange 216 having a bolt hole 218 to couple to the rods 206. In one embodiment, each of the tie bands 204 can be coupled to each of the circumferential bands 202. For instance, as shown generally in FIGS. 6A-6B, the tie bands 204 can be coupled to each of the circumferential bands 202 from the farthest to the nearest circumferential band 202. In one embodiment, the tie bands 204 can be welded to the circumferential bands 202, as shown in FIGS. 6A-6B and FIG. 7. In another embodiment, the tie bands 204 can be bolted to the circumferential bands 202, as shown in FIG. 9.

The rods 206 can generally be located near a bell of a flared end section. In one embodiment, the rods 206 can be L-shaped rods with threads on each end of the rod. In a typical implementation, holes can be drilled through the bell of the flared end section. The rods 206 can be inserted into the holes and secured on an interior of the bell end of the flared end section with a nut. The other end of the rods 206 can be coupled to the tie bands 204 with a nut.

The gasket 208 can be implemented to fill space between the corrugated pipe and the concrete section. In one embodiment, the gasket 208 can have a circular shape with an exterior circumference that matches and interior circumference of the bell of the concrete section. The gasket 208 can generally cover a full depth of the bell and taper near an end of the bell. In one embodiment, the gasket 208 can meet the ASTM F477/C443 standards.

In a typical implementation, the second embodiment coupler assembly kit 200 can include three circumferential bands 202, three tie bands 204, three rods 206, and one gasket 208. The three circumferential bands 202 can be coupled together by the three tie bands 204. For illustrative purposes only, assuming a cross-section of each of the circumferential bands 202 is viewed as an analog clock, the tie bands 204 can be coupled to the circumferential bands 202 at approximately 12:00, 3:00, and 9:00. The tie bands 204 can be generally until approximately within 12 inches of an end of the corrugated pipe. Within 12 inches of the end of the corrugated pipe, the tie bands 204 can be bent outward to match an outside diameter of the bell of the concrete section.

The bell end of the concrete section can be core-drilled at the 12:00, 3:00, and 9:00 locations. At each of the holes, one end of the rod 206 can be inserted through a wall of the concrete section and a nut placed on an inside of the wall. The rod 206 can be securely attached to the concrete section.

Generally, the gasket 208 can be manufactured for a specific application. For instance, the gasket 208 can generally have a circular shape with an exterior circumference that matches an interior circumference of a bell end of a concrete section. The gasket 208 can have a continuous flange that can substantially cover a full depth of the bell. In one embodiment, the gasket 208 can taper to a ¼ inch thickness at an end of the bell.

In one embodiment, each of the components of the coupler can be manufactured from stainless steel. Due to exposure to weather and potentially harmful soils, stainless steel can last over long-term exposure to the elements. It is to be appreciated that other materials having similar properties to stainless steel can be implemented to manufacture the components of the second embodiment coupler assembly kit 200.

Referring to FIGS. 6A-6B, a top section view and a side section view of the second embodiment coupler assembly kit 200 are illustrated. FIG. 6A generally shows two circumferential bands 202, two rods 204, two tie bands 206, and a corrugated pipe 230 being coupled to a concrete section 240. FIG. 6A further shows the 3:00 and 9:00 locations of where the tie bands 204 are coupled to the circumferential bands 202 and the rods 206. FIG. 6B generally shows the 12:00 location of the tie band 204 coupled to the circumferential band 202 and the rod 206.

Referring to FIG. 7, a side view of a circumferential band 202 and a plurality of tie bands 204 is illustrated. The 3:00, 9:00, and 12:00 location of the tie bands 204 being coupled to the circumferential band 202 are shown. The two semi-circle sections 220, 222 that make up the circumferential band 202 are also shown. Nut and bolt assemblies 214 are shown coupling a plurality of flanges 216 of the semi-circle sections 220, 222 together. The plurality of juts 210 are shown coupled to the circumferential band 202.

Referring to FIG. 8, a close up cross-sectional side view of a tie band 204 coupling to a rod 206 is illustrated. As shown, the tie band 204 can couple to the rod 206 by the flange 212 where the rod 206 can be threaded through the bolt hole 214. A nut can be implemented to secure the tie band 204 to the rod 206. FIG. 8 further shows a portion of the gasket 208.

Referring to FIG. 9, a top section view of a second embodiment coupler assembly kit 200 coupling to a cast-in-place concrete headwall 250 is illustrated. As shown, reinforcing bolts 207 can be implemented in place of the rods 206. For instance, the headwall 250 may include the reinforcing bolts 207 cast into the headwall 250. The tie bands 204 can be coupled to the cast reinforcing bolts 207.

An Example Implementation of the Second Embodiment Coupler Assembly Kit

Generally, the second embodiment coupler assembly kit 200 can be implemented to couple a corrugated pipe to a reinforced-concrete component. Typically, the coupler assembly kit 200 can be assembled on site. For illustrative purposes only, a reinforced-concrete flare end section will be referenced for this example.

In a first step, the plurality of circumferential bands 202 can be attached to an exterior of the corrugated pipe. The circumferential bands 202 can typically be placed in valleys of the corrugated pipe. Generally, the tie bands 204 will already be welded to the circumferential bands 202. The tie bands 204 can typically be located at locations corresponding to 12:00, 3:00 and 9:00 on a clock.

In a second step, a bell end of a reinforced-concrete flared end section can be core-drilled at least four inches from an end of the bell. Generally, the bell end can be core-drilled at locations corresponding to 12:00, 3:00 and 9:00 on a clock. The rods 206 can then be inserted into and secured to the reinforced-concrete flared end section.

In a third step, the gasket 208 can be inserted into the bell of the reinforced-concrete flared end section.

Once the gasket 208 is in place, the spigot end of the corrugated pipe can be inserted into the reinforced-concrete flared end section in a fourth step.

In a fifth step, the tie bands 204 can be coupled to the rods 206. Generally, the rods 206 can be threaded through the bolt holes 214 provided within the flanges 212 on the end of the tie bands 204.

In a sixth step, the corrugated pipe and a portion of the flared end section can be backfilled.

It is to be appreciated that the process disclosed is for illustrative purposes only and not meant to be limiting. The steps provided can be done in a different order without exceeding a scope of the present invention.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A coupler assembly kit comprising:
   a circumferential cable;
   a plurality of linkage crosses, wherein the circumferential cable is adapted to be threaded through each of the plurality of linkage crosses; and
   a plurality of cables each having a first end and a second end, wherein (i) the first end includes a threaded rod and the second end includes an eye bolt, and (ii) each of the threaded rods are adapted to couple to one of the plurality of linkage crosses;
   wherein each of the linkage crosses comprise:
      a first tube; and
      a second tube, wherein (i) a middle section of the second tube is directly coupled to a middle section of the first tube, and (ii) the second tube is oriented perpendicularly to the first tube.

2. The coupler assembly kit of claim 1, wherein the coupler assembly kit further includes a gasket.

3. The coupler assembly kit of claim 1, wherein (i) the circumferential cable is adapted to be threaded through the first tube of each linkage cross, and (ii) the threaded rods are each adapted to be threaded through the second tube of one of the plurality of linkage crosses.

4. The coupler assembly kit of claim 3, wherein a nut and a washer are implemented to couple the threaded rods to the linkage crosses.

5. The coupler assembly kit of claim 1, wherein the circumferential cable is a ¼ inch stainless steel aircraft cable epoxy-coated to 5/16 inch outside diameter.

6. The coupler assembly kit of claim 5, wherein each of the plurality of cables are each a ¼ inch stainless steel aircraft cable epoxy-coated to 5/16 inch outside diameter.

7. The coupler assembly kit of claim 1, wherein the circumferential cable is adapted to fit into a valley of a corrugated pipe.

8. The coupler assembly kit of claim 1, wherein the first tube of each of the plurality of linkage crosses is adapted to fit into a valley of the corrugated pipe.

9. The coupler assembly kit of claim 1, wherein the circumferential cable is coupled to itself by at least one wire rope clamp.

10. A coupler assembly kit comprising:
    a circumferential cable;
    a gasket;
    a plurality of linkage crosses including a first tube coupled perpendicularly to a second tube; and
    a plurality of cables each having a first end including a threaded rod and a second end including an eye bolt;
    wherein when the coupler assembly kit is coupling a corrugated pipe to a concrete section:
       the circumferential cable is (i) threaded through the first tube of each of the plurality of linkage crosses, (ii) coupled to itself by one or more wire rope clamps, and (iii) located in a valley of the corrugated pipe;
       the first tube of each of the plurality of linkage crosses is located in the valley of the corrugated pipe;
       the threaded rod of each of the plurality of cables is coupled to one of the second tubes of the plurality of linkage crosses;
       the eye bolts of the plurality of cables are each coupled to the concrete section; and
       the gasket is coupled to a bell end of the concrete section.

11. The coupler assembly kit of claim 10, wherein the circumferential cable is a ¼ inch stainless steel aircraft cable epoxy-coated to 5/16 inch outside diameter.

12. The coupler assembly kit of claim 11, wherein each of the plurality of cables are each a ¼ inch stainless steel aircraft cable epoxy-coated to 5/16 inch outside diameter.

13. The coupler assembly kit of claim 10, wherein each of the linkage crosses is manufactured from stainless steel.

14. The coupler assembly kit of claim 10, wherein the concrete section is selected from the group consisting of a reinforced-concrete pipe and a reinforced-concrete flared end section.

15. The coupler assembly kit of claim 10, wherein the corrugated pipe is manufactured from high-density polyethylene.

16. The coupler assembly kit of claim 10, wherein the gasket creates a watertight connection between the corrugated pipe and the concrete section.

17. The coupler assembly kit of claim 10, wherein (i) a first linkage cross is located approximately at an apex of the valley of the corrugated pipe, (ii) a second linkage cross is located approximately at a proximal springline of the corrugated pipe, and (iii) a third linkage cross is located approximately at a distal springline of the corrugated pipe.

18. The coupler assembly kit of claim 17, wherein (i) a first eye bolt is located approximately at an apex of the bell end of the concrete section, (ii) a second eye bolt is located approximately at a proximal springline of the bell end of the concrete section, and (iii) a third eye bolt is located approximately at a distal springline of the bell end of the concrete section.

19. A method of implementing a coupler assembly kit, the method comprising:
    providing a coupler assembly kit, the coupler assembly kit including:
       a gasket;
       a circumferential cable;
       a plurality of linkage crosses, wherein the circumferential cable is adapted to be threaded through each of the plurality of linkage crosses; and
       a plurality of cables each having a first end and a second end, wherein the first end includes a threaded rod and the second end includes an eye bolt;
    drilling a plurality of holes in a reinforced-concrete flared end section;
    coupling the eye bolts to the drilled holes;
    coupling the gasket to a bell end of the reinforced-concrete flared end section;
    threading the circumferential cable through a first tube of each of the plurality of linkage crosses;
    securing the circumferential cable around a corrugated pipe, wherein the circumferential cable is located in a valley of the corrugated pipe;
    inserting the corrugated pipe into the bell end of the reinforced-concrete flared end section;
    coupling the threaded rod of each of the plurality of cables to a second tube of the plurality of linkage crosses;
    forming a watertight coupling between the corrugated pipe and the reinforced-concrete flared end section by tightening each of the threaded rods to the second tubes.

* * * * *